US009873570B2

(12) United States Patent
Van Mill et al.

(10) Patent No.: US 9,873,570 B2
(45) Date of Patent: *Jan. 23, 2018

(54) WEIGHT-BASED CHUTE CONTROL FOR A FARM IMPLEMENT

(71) Applicant: Unverferth Manufacturing Company, Inc., Kalida, OH (US)

(72) Inventors: Michael Van Mill, Shell Rock, IA (US); Ronald J. Schlimgen, Shell Rock, IA (US); Shawn W. Gerdeman, Delphos, OH (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/055,327

(22) Filed: Feb. 26, 2016

(65) Prior Publication Data

US 2016/0251167 A1    Sep. 1, 2016

Related U.S. Application Data

(63) Continuation of application No. 14/213,095, filed on Mar. 14, 2014, now Pat. No. 9,272,853.

(Continued)

(51) Int. Cl.
*B65G 69/00* (2006.01)
*G01G 13/00* (2006.01)
(Continued)

(52) U.S. Cl.
CPC ............... *B65G 43/08* (2013.01); *B60P 1/42* (2013.01); *B65G 11/126* (2013.01); *B65G 67/04* (2013.01);
(Continued)

(58) Field of Classification Search
CPC ...... B60P 1/00; B60P 1/36; B60P 1/40; B60P 1/42; B60P 1/56; B60P 3/00; B65G 67/04; B65G 65/42; B65G 65/46; B65G 65/466; B65G 33/08; B65G 33/26; B65G 49/00; B65G 43/00; B65G 11/126; B65G 69/0441; B65G 67/24; B65G 43/08; B28C 7/162; B28C 7/167; A01D 90/10; A01D 90/105;
(Continued)

(56) References Cited

U.S. PATENT DOCUMENTS 2,093,300 A    9/1937  Adams et al.
2,271,434 A    1/1942  Johnhson
(Continued)

OTHER PUBLICATIONS

Dinomica Generale, Grain Scale, web page, Feb. 1, 2011, 2 pages.
(Continued)

*Primary Examiner* — Stephen A Vu
(74) *Attorney, Agent, or Firm* — Rothwell, Figg, Ernst & Manbeck, p.c.

(57) ABSTRACT

A system and method for discharging material from a chute on a farm implement into a container or bin such that the discharged material is evenly distributed in the container or bin. The system and method includes a farm implement with a bin for holding material, a conveyor for discharging material from the bin and a chute at the end of the conveyor for directing the material discharged from the conveyor. The chute may be moved into a plurality of positions based on sensor outputs to facilitate the even distribution of material in the container or bin receiving the discharged material.

14 Claims, 8 Drawing Sheets

Related U.S. Application Data

(60) Provisional application No. 61/799,099, filed on Mar. 15, 2013, provisional application No. 61/821,552, filed on May 9, 2013.

(51) Int. Cl.

| | | |
|---|---|---|
| *B65G 43/08* | (2006.01) | |
| *B65G 67/04* | (2006.01) | |
| *B60P 1/42* | (2006.01) | |
| *B65G 11/12* | (2006.01) | |
| *B65G 67/24* | (2006.01) | |
| *B65G 69/04* | (2006.01) | |

(52) U.S. Cl.
CPC ......... *B65G 67/24* (2013.01); *B65G 69/0441* (2013.01); *B65G 2203/0258* (2013.01); *B65G 2814/027* (2013.01); *B65G 2814/0344* (2013.01)

(58) Field of Classification Search
CPC ................ A01D 90/12; A01D 41/1217; A01D 41/1272; A01D 41/1273; A01D 41/1274; A01D 41/1275; A01D 61/008; A01D 61/02; B65H 2220/01; B65H 2220/02; B01F 15/00136; B01F 15/00149; G05D 7/0611; G01G 11/08; G01G 11/083; G01G 11/12; G01G 19/02; B65F 2003/022; B65F 2003/258
See application file for complete search history.

(56) References Cited

U.S. PATENT DOCUMENTS

| | | |
|---|---|---|
| 2,867,336 A | 1/1959 | Soldini et al. |
| 2,896,771 A | 7/1959 | Mecham |
| 3,074,654 A | 1/1963 | Guggemos |
| 3,090,515 A | 5/1963 | Crowther |
| 3,493,136 A | 2/1970 | Spellman, Jr. |
| 3,498,483 A | 3/1970 | Meharry |
| 3,572,843 A | 3/1971 | Birdsall |
| 3,677,540 A | 7/1972 | Weiss |
| 3,782,528 A | 1/1974 | Burger et al. |
| 3,835,868 A | 9/1974 | Heck |
| 3,837,415 A | 9/1974 | Connors et al. |
| 3,913,850 A | 10/1975 | Daniel |
| 3,968,771 A | 7/1976 | Walgenbach et al. |
| 4,037,745 A | 7/1977 | Hengen et al. |
| 4,044,920 A | 8/1977 | Swartzendruber |
| 4,222,498 A | 9/1980 | Brock |
| 4,236,240 A | 11/1980 | Yoshida |
| 4,345,628 A | 8/1982 | Campbell et al. |
| 4,411,581 A | 10/1983 | Niewold |
| 4,465,211 A | 8/1984 | van der Lely et al. |
| 4,503,803 A | 3/1985 | Barnes |
| 4,522,275 A | 6/1985 | Anderson |
| 4,619,531 A | 10/1986 | Dunstan |
| 4,742,938 A | 5/1988 | Niewold |
| 4,911,256 A | 3/1990 | Attikiouzel |
| 5,016,197 A | 5/1991 | Neumann et al. |
| 5,186,396 A | 2/1993 | Wise et al. |
| 5,285,020 A | 2/1994 | Jurca |
| 5,299,313 A | 3/1994 | Petersen et al. |
| 5,354,526 A | 10/1994 | Jost et al. |
| 5,423,455 A | 6/1995 | Ricciardi et al. |
| 5,424,957 A | 6/1995 | Kerkhoff et al. |
| 5,468,113 A | 11/1995 | Davis |
| 5,484,249 A | 1/1996 | Klatt |
| 5,520,495 A | 5/1996 | Sukup |
| 5,529,455 A | 6/1996 | Kaster et al. |
| 5,718,556 A | 2/1998 | Forsyth |
| 5,764,522 A | 6/1998 | Shalev |
| 5,785,481 A | 7/1998 | Ockels |
| 5,800,116 A | 9/1998 | Smith et al. |
| 5,835,868 A | 11/1998 | McElroy et al. |
| 5,853,244 A | 12/1998 | Hoff et al. |
| 5,880,407 A | 3/1999 | Flammang |
| 5,888,044 A | 3/1999 | Baskerville |
| 6,042,326 A | 3/2000 | Thomas |
| 6,066,809 A | 5/2000 | Campbell et al. |
| 6,120,233 A | 9/2000 | Adam |
| 6,209,880 B1 | 4/2001 | Turnwald |
| 6,325,588 B1 | 12/2001 | Nolin |
| 6,354,465 B2 | 3/2002 | Bell et al. |
| 6,384,349 B1 | 5/2002 | Voll |
| 6,405,855 B1 | 6/2002 | Peltier et al. |
| 6,594,979 B2 | 7/2003 | Krone |
| 6,604,620 B2 | 8/2003 | Dennis |
| 6,621,014 B1 | 9/2003 | Tanner et al. |
| 6,767,174 B2 | 7/2004 | Cresswell |
| 6,814,532 B1 | 11/2004 | Thompson et al. |
| 6,964,551 B1 | 5/2005 | Friesen |
| 6,971,324 B1 | 12/2005 | Beck |
| 6,981,833 B2 | 1/2006 | Guhr |
| 7,017,624 B2 | 3/2006 | Renisch et al. |
| 7,055,559 B2 | 6/2006 | Reinsch et al. |
| 7,104,425 B2 | 9/2006 | Le Roy |
| 7,343,726 B2 | 3/2008 | Hettiger |
| 7,393,275 B2 | 7/2008 | Voss et al. |
| 7,428,042 B2 | 9/2008 | Ghiraldi |
| 7,454,304 B2 | 11/2008 | Johansen et al. |
| 7,488,149 B2 | 2/2009 | Waldner |
| 7,500,817 B2 | 3/2009 | Furrer et al. |
| 7,507,917 B2 | 3/2009 | Kaltenheuser |
| 7,629,542 B1 | 12/2009 | Harding et al. |
| 7,633,021 B2 | 12/2009 | Pfohl et al. |
| 7,735,365 B2 | 6/2010 | Crain et al. |
| 7,858,888 B2 | 12/2010 | Lucas et al. |
| 7,874,899 B2 | 1/2011 | Mackin et al. |
| 8,097,820 B2 | 1/2012 | Klubertanz |
| 2001/0038018 A1 | 11/2001 | Bell et al. |
| 2003/0042273 A1 | 3/2003 | House |
| 2003/0057055 A1 | 3/2003 | Haukaas et al. |
| 2006/0114743 A1 | 6/2006 | Galijan |
| 2006/0180062 A1 | 8/2006 | Furrer et al. |
| 2007/0084378 A1 | 4/2007 | Creighton |
| 2008/0127711 A1 | 6/2008 | Farag |
| 2009/0020076 A1 | 1/2009 | Ghiraldi |
| 2009/0099775 A1 | 4/2009 | Mott et al. |
| 2009/0205877 A1 | 8/2009 | Claypool |
| 2010/0009731 A1 | 1/2010 | Coers et al. |
| 2010/0193256 A1 | 8/2010 | Klubertanz |
| 2010/0274452 A1 | 10/2010 | Ringwald et al. |
| 2010/0314221 A1 | 12/2010 | Garberson et al. |
| 2011/0220677 A1 | 9/2011 | Bertolani |
| 2012/0085458 A1 | 4/2012 | Wenzel |
| 2012/0099948 A1 | 4/2012 | Bump et al. |
| 2013/0045067 A1 | 2/2013 | Pickett et al. |
| 2013/0103249 A1 | 4/2013 | Pieper et al. |

OTHER PUBLICATIONS

Canadian Office Action, Application No. 2,578,512, dated Apr. 10, 2013, 3 pages.
Model 2300 Air System and the Model 4800 Air Drill, both made and sold by Concord, as illustrated in the Concord brochure, 12 pages.
Digi-Star EZ 400 Operators Manual, Mar. 4, 2008, 22 pages.
Amendment filed in U.S. Appl. No. 12/862,052 on Mar. 28, 2013, 16 pages.

WEIGHT-BASED CHUTE CONTROL FOR A FARM IMPLEMENT

CROSS-REFERENCE TO RELATED APPLICATION

This application is a continuation of application Ser. No. 14/213,095, filed Mar. 14, 2014, which has been issued as U.S. Pat. No. 9,272,853 on Mar. 1, 2016, and claims the benefit of U.S. Provisional Application No. 61/799,099, filed Mar. 15, 2013, and U.S. Provisional Application No. 61/821,552, filed May 9, 2013, the entire disclosures of which are incorporated herein in their entirety.

BACKGROUND OF THE INVENTION

Field of the Invention

The present invention relates generally to systems and methods for unloading agricultural material from a farm implement, such as a grain cart, into a bin or container.

Description of the Related Art

Farm implements with storage bins configured to transport grain or seed and load containers or bins with the transported material, such as grain carts, typically include a conveyor with a chute at the discharge end. The auger or conveyor is positioned on the grain cart such that it may be used to discharge material into a container or bin next to the grain cart. The chute is typically fixed in a downward facing position so that the material discharged from the auger or conveyor is directed downwardly into the bin or container. The problem with this system is that all of the discharged material is directed to the same location in the bin or container, which may cause the material in the bin to be unevenly distributed. The uneven distribution of material can put undue strain on the frame of the container or semi-trailer in which it is loaded, cause overflow of material prior to using the full capacity of the grain cart and/or container and increase likelihood of roll over. Also, the uneven distribution of material can cause overloading of container and/or uneven loading of the axles, which may cause stress on roadways or weight tickets from the Department of Transportation. To change the position the material is discharged, the vehicle towing the implement, such as a tractor, must continually move forward in short intervals. Repositioning the grain cart and tractor relative to the storage bin wastes time and fuel. This constant starting and stopping puts a large amount of wear and tear on the clutch of the vehicle.

SUMMARY OF THE INVENTION

In accordance with a first aspect of the present invention, an apparatus for conveying material into a container comprises a conveyor including a first end configured to receive material and a second end configured to discharge material and a chute including a first end pivotably coupled to the second end of the conveyor for rotation about a first axis of rotation and a second end configured to discharge material. The chute is pivotable relative to the second end of the conveyor about a first axis of rotation and the second end of the chute (an opening) is oriented to discharge at an angle relative to the axis of rotation such that the second end of the chute is moveable in a first plane. The second end of the chute may be oriented to discharge at an angle between 0 and 90 degrees relative to the axis of rotation.

In another aspect of the present invention, the apparatus also includes a first cylinder configured to pivot the chute about the first axis of rotation.

In another aspect of the present invention, the first axis is approximately parallel to a longitudinal axis of the conveyor.

In another aspect of the present invention, the first end of the chute is pivotable relative to the second end of the conveyor about a second axis of rotation such that the second end of the chute is moveable in a second plane. The first axis of rotation may be approximately orthogonal to the second axis of rotation, and the first plane may be approximately orthogonal to the second plane.

In another aspect of the present invention, the apparatus includes a second cylinder configured to pivot the chute about the second axis of rotation.

In another aspect of the present invention, the apparatus also includes a scale configured to measure the amount of material discharged by the apparatus and a controller configured to pivot the chute about the first axis of rotation when a target amount of material has been discharged. The target amount of material may be a pre-determined amount of material and the apparatus includes an input for an operator to enter the pre-determined amount.

In another aspect of the present invention, the first end of the chute is pivotable relative to the second end of the conveyor relative to a second axis of rotation such that the second end of the chute is moveable in a second plane, and wherein the controller is configured to pivot the chute about the second axis of rotation when a second target amount of material has been discharged.

In another aspect of the present invention, a method for discharging material evenly in a container comprises the steps of discharging material from a chute and positioning a chute such that the material is discharged in a first direction into a container. The method also includes the steps of measuring an amount of material discharged from the chute and, when a target amount of material has been discharged from the chute, positioning the chute such that the material is discharged in a second direction into the container.

In another aspect of the present invention, the step of positioning the chute such that the material is discharged in a second direction comprises pivoting the chute about a first axis of rotation.

In another aspect of the present invention, the method further comprises the step of pivoting the chute about a second axis of rotation when a second target amount of material has been discharged from the chute such that the material is discharged from the chute in a direction different than the first or second direction.

In another aspect of the present invention, the method further comprises the step of stopping the chute from discharging material when a third target amount of material has been discharged. The step of stopping the chute from discharging may include shutting the container door to stop the flow of grain from the grain cart bin to the conveyor.

In another aspect of the present invention, the method further comprises the steps of providing a cylinder coupled to the chute and adjusting the length of the cylinder to pivot the chute about the first axis of rotation.

In another aspect of the present invention, the method further comprises the steps of providing a second cylinder coupled the chute and adjusting the length of the second cylinder to pivot the chute about the second axis of rotation.

In another aspect of the present invention, a method of creating an automatic chute unload routine for a mobile farm implement including a bin to store material and a chute moveable between a plurality of positions and configured to discharge material stored in the bin comprises the steps of recording a first position of the chute and a weight of the material stored in the bin and discharging material from the bin out of the chute. The method also includes the steps of monitoring weight of the bin and determining a first amount of material discharged from the bin and, when the chute is moved to a second position, recording the second position and the first amount of material discharged from the bin. The method further includes the steps of monitoring the weight of the bin and determining a second amount of material discharged from the bin and, when material stops being discharged from the chute, recording the second amount of material discharged from the bin.

In another aspect of the present invention, the method also comprises the steps of, when the chute is moved to a third position, recording the third position and the second amount of material discharged from the bin. The method further comprises the steps of monitoring the weight of the bin and determining a third amount of material discharged from the bin, and, when material stops being discharged from the chute, recording the third amount of material discharged from the bin.

DETAILED DESCRIPTION OF THE DRAWINGS

While the present invention may be embodied in many different forms, a number of illustrative embodiments are described herein with the understanding that the present disclosure is to be considered as providing examples and not intended to limit the invention to the preferred embodiments described and/or illustrated herein.

The present invention is directed to an automated method and system of unloading material from a farm implement having a conveyor, such as a grain cart or seed tender, by controlling the position of a chute at the end of a conveyor discharging material from the implement into a hopper, container, or bin next to the implement. The method includes monitoring the weight of material discharged from the implement and adjusting the position of the chute when target weights are reached. While the present invention is described herein with reference to a grain cart having a auger type conveyor with a chute at a discharge end, it may be used on any type of farm implement having a conveyor with a chute or spout, including without limitation auger, belt, or pneumatic conveyors.

Figure 1:
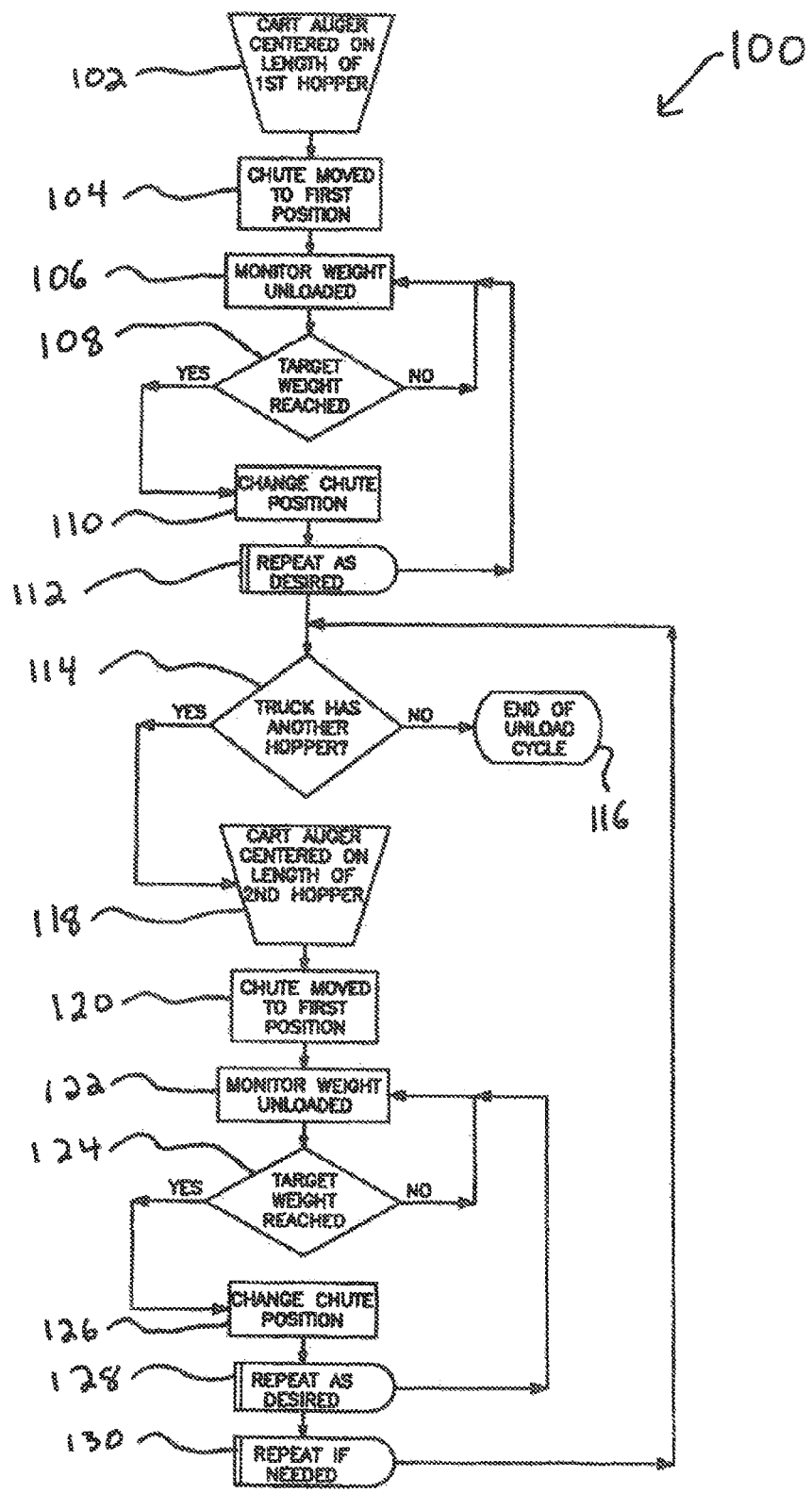
FIG. 1 is a flow chart illustrating a method of controlling the position of a chute discharging material into a container according to an embodiment of the present invention.

FIG. 1 is a flow chart illustrating a method 100 of unloading agricultural material or product from a farm implement via a conveyor by controlling the position of a chute on the conveyor that discharges material into a container or hopper next to the implement according to an embodiment of the present invention. The first step 102 is positioning the conveyor of the implement (e.g., a cart, such as a grain cart) in the center of a first hopper length-wise. If the conveyor is foldable, the conveyor should be unfolded into its discharge position relative to the farm implement so that the chute is positioned over the hopper. In the case of a grain cart, the conveyor may be positioned by towing the grain cart with a tractor. After the positioning step 102, the chute of the conveyor is moved into a first position in step 104 in which the chute opening or discharge is oriented toward a rear of the hopper and the discharge of material from the chute is commenced. In one embodiment, step 104 is performed by rotating the chute about a first axis of rotation extending along a longitudinal axis of the chute and parallel to or offset from the longitudinal axis of the conveyor. The weight of the material discharged is monitored in step 106. This monitoring step may be accomplished by monitoring the weight of the material stored in the bin of the grain cart and equating the amount of material discharged with the loss of weight in the bin. The weight may be monitored with a weight monitoring system, such as the system disclosed in commonly-owned U.S. Pat. No. 7,205,490, the entire contents of which is incorporated herein by reference.

As the weight of material discharged is monitored, a determination is made whether a target weight has been reached at step 108, and, if it has not been reached, the position of the chute will be maintained and the weight of material discharged will continue to be monitored. If it is determined that the target weight has been reached at step 108, the position of the chute will be changed at step 110 to the next position, e.g., to a second position oriented toward a front of the hopper if the chute was in a first position, or to a third position if the chute was in a second position. In one embodiment, changing to the second position in step 110 is performed by rotating the chute about a first axis of rotation extending along a longitudinal axis of the chute and parallel to or offset from the longitudinal axis of the conveyor. In an embodiment, changing to the third position in step 110 is performed by rotating one end of the chute about a second axis of rotation perpendicular to the first axis of rotation. After the position of the chute has been changed, the process between steps 106 and 110 is repeated until all desired positions of the chute have been used 112. For example, if there are four positions of the chute to be used, after moving the chute from the first position to the second position, steps 106 through 110 will be repeated when moving from the second position to the third position and the third position to the fourth position. After the final position, e.g., a fifth position in five position operation, the system will determine whether another hopper needs to be filled at step 114.

If there are no additional hoppers, the cycle is ended at step 116. If there are additional hoppers, a new cycle is commenced and the first step is positioning the conveyor of the grain cart in the center of the second hopper length-wise at step 120. The cycle then follows the same steps discussed above with respect to controlling the position of the chute based on weight 122, 124, 126 and 128, i.e., monitoring the weight unloaded, determining if a target weight has been reached, changing the chute position to a next position, and repeating the steps until all desired chute positions have been used. The above method may be controlled by software or firmware instructions running on a control system or node on the grain cart, the tractor, and/or on a portable or handheld controller. The control system may include one or more computer processors or microcontrollers and one or more memory devices to store the software and other data. In an embodiment, the control system is in communication with sensors (e.g., weight and chute position sensors) and chute control devices (e.g., hydraulic cylinders, linear actuators, belts and pulleys, or servo motors) on the cart.

FIGS. 2-8 illustrate a farm implement including a weight based chute control according to an embodiment of the present invention. A farm implement 200, such as a grain cart, includes a bin 202, a conveyor 204 and a chute 210 coupled to a discharge of the conveyor 208 and may be used to fill containers 300 (such as semi-trailer trucks) with material. In an embodiment, conveyor 204 includes a tubular housing enclosing a rotatable auger. *****The bin 202 is configured to store grain, seed or any other pourable or granular material, and the farm implement 200 includes a weigh system to determine the weight of the material stored in the bin 202. In an embodiment of the present invention, the bin 202 is at least as large as any containers 300 the farm implement 200 fills with material. The conveyor 204 includes an input 206 configured to receive material from the bin 202. In an embodiment of the present invention, the farm implement 200 may include a second conveyor or auger (not shown) at the bottom of the bin 202 and configured to transport material from the bin 202 to the input 206 of the conveyor 204. The conveyor 204 discharges material from an output 208, and the chute 210 is coupled to the output 208 so as to direct the discharged material. The chute 208 includes a body 212 (see FIG. 5) coupled to the output 208 at a first end and extending away from a longitudinal axis of the conveyor I1 and an opening 214 (see FIG. 5) at an end of the body opposite the first end. As material is discharged from the conveyor 204, the material exits the output 208 and is directed out of the opening 214 of the chute 210.

Figure 6:
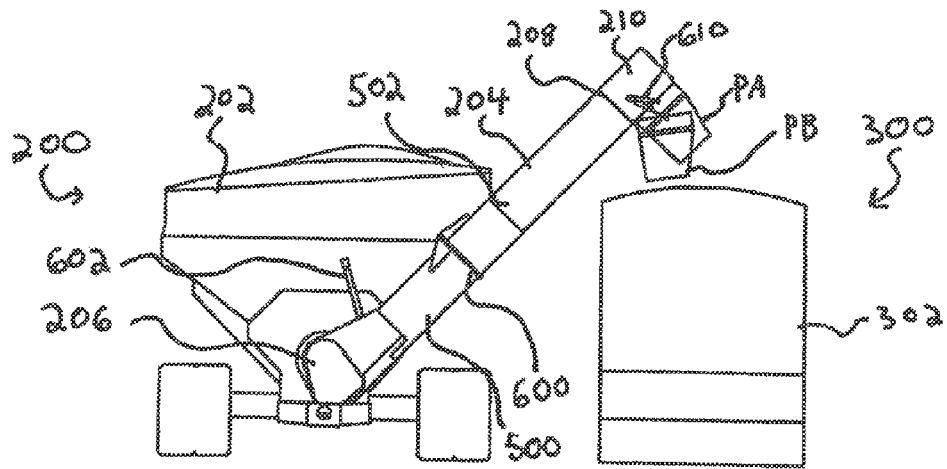
FIG. 6 is a front view of a grain cart including a chute overlayed in a first position and a third position and positioned to discharge material into a bin according to an embodiment of the present invention.
Figure 7:
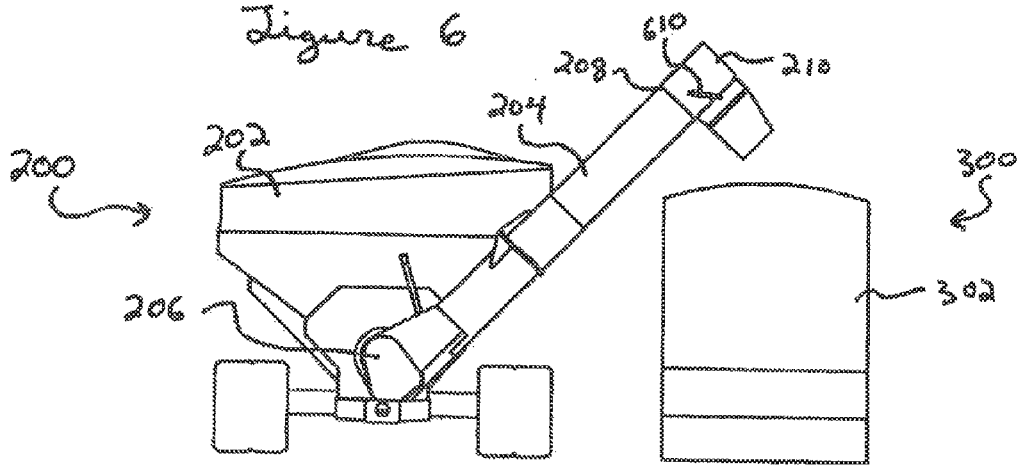
FIG. 7 is a front view of a grain cart including a chute in a first position and positioned to discharge material into a bin according to an embodiment of the present invention.
Figure 8:
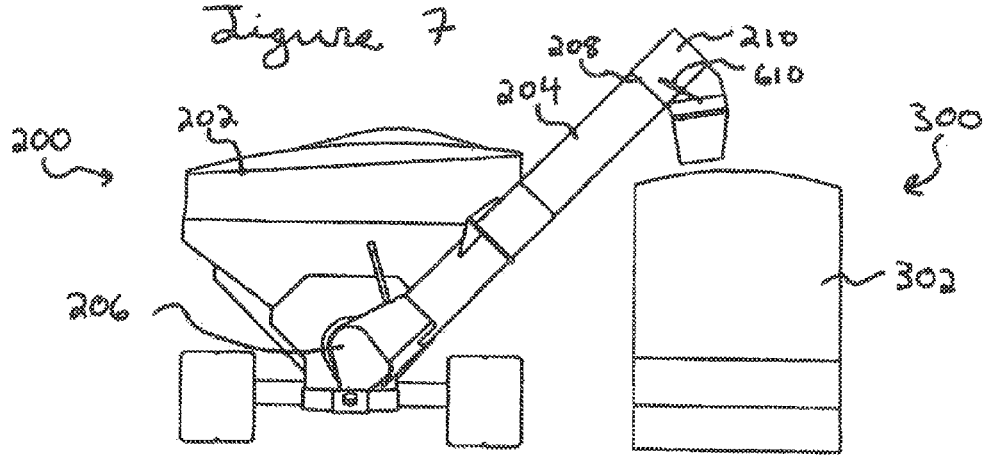
FIG. 8 is a front view of a grain cart including a chute in a third position and positioned to discharge material into a bin according to an embodiment of the present invention.

As shown in FIGS. 6-8, the conveyor 204 may be a folding conveyor with a lower conveyor portion 500 and an upper conveyor portion 502 pivotable relative to the lower conveyor portion 500 about a joint assembly 600. The upper conveyor portion 502 may be pivoted between an operating position and a stored position in which it may abut rest 602. The angle of the conveyor 204 relative to the ground may be adjusted with one or more hydraulic cylinders, which allows for the height of the output 208 and chute 210 to be adjusted. This is advantageous when filling containers 300 of various heights because it allows the chute 210 to be positioned very close to the tops of the containers 300.

The containers 300 may be towable containers or hoppers coupled to a vehicle, and may include a first container 302 and a second container 302. The containers 300 may be oriented along a longitudinal axis I2. The farm implement 200 is preferably positioned such that the longitudinal axis of the conveyor I1 is approximately perpendicular to the longitudinal axis of the containers I2 and the conveyor discharge 208 is at the approximate center of the container 302 or 304 being filled.

Figure 2:
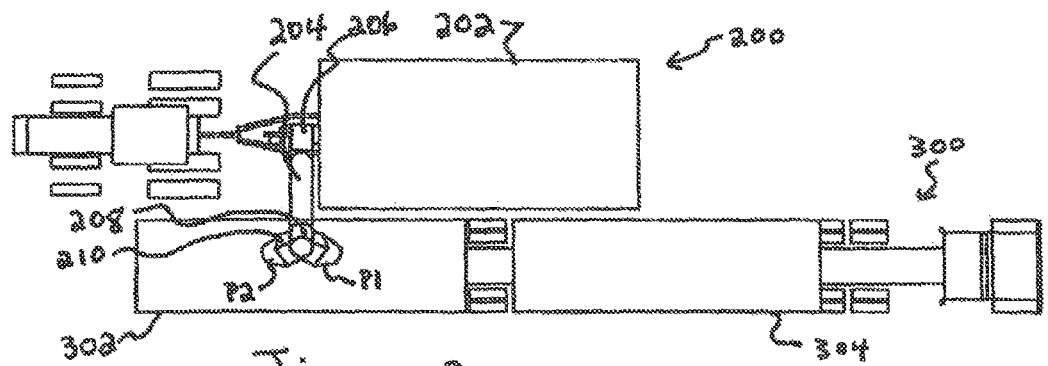
FIG. 2 is top view of a grain cart positioned to discharge material into a first bin showing first and second positions of a chute according to an embodiment of the present invention.
Figure 3:
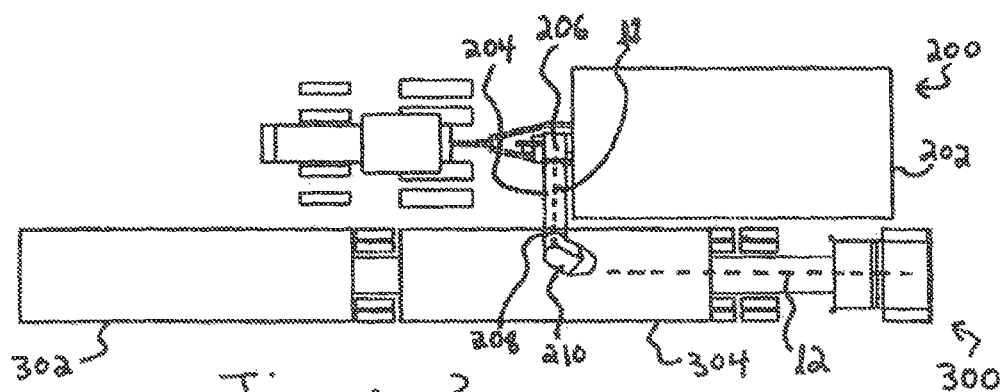
FIG. 3 is a top view of a grain cart including a chute in a first position to discharge material into a second bin according to an embodiment of the present invention.
Figure 4:
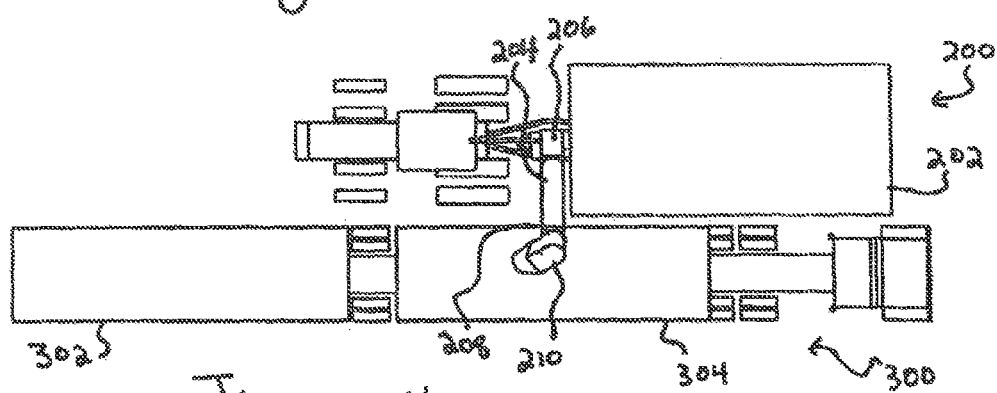
FIG. 4 is a top view of a grain cart including a chute in a second position to discharge material into a second bin according to an embodiment of the present invention.
Figure 5:
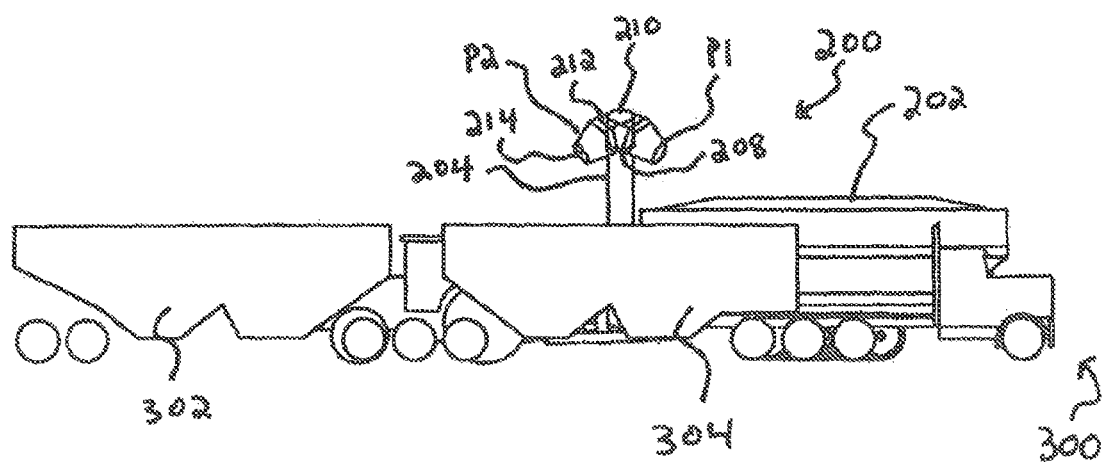
FIG. 5 is a side view of a grain cart including a chute overlayed in a first position and a second position and positioned to discharge material into a bin according to an embodiment of the present invention.

In FIG. 2, the chute 210 is illustrated overlayed in a first position P1 and a second position P2. The chute 210 is pivotably coupled to the conveyor such that it may pivot about a first axis of rotation between at least the first position P1 and second position P2. The first axis of rotation of the chute 210 may be approximately parallel to the longitudinal axis of the conveyor I1 such that when the chute 210 pivots about the first axis of rotation the body 212 and opening 214 rotate about the longitudinal axis of the conveyor I1 in a clockwise or counterclockwise manner. Pivoting the chute 210 about the first axis of rotation redirects the direction the material is discharged from the chute 210 approximately along the longitudinal axis of the containers I2. For example, in FIGS. 3 and 4, a chute 210 in the first position P1 will discharge material towards the front of the container 304, and, when the chute is pivoted clockwise about the first axis of rotation, the direction of the discharge will change from discharging material towards the center of the container and then eventually towards the rear of the container 304, such as when the chute 210 is in the second position P2. The chute 210 may be positioned to direct the discharge anywhere along the first axis of rotation, and may have more than two positions, i.e., the chute 210 may be placed in a third position in which the material is discharged towards the center of the container 302 or 304 or any other position along the first plane. The chute 210 also includes sensors which detect the position of the chute 210 so that the processor may determine which position (e.g., P1 or P2) the chute 210 is in and, when pivoting the chute, if the chute 210 has reached its next position. The sensors and the processor that monitors the sensors will be discussed in further detail below with respect to FIG. 9.

In an embodiment of the present invention, the chute 210 may pivot around a second axis of rotation that is approximately orthogonal to the first axis of rotation, as shown in FIGS. 6-8. Pivoting the chute 210 about the second axis of rotation redirects the direction the material is charged from the chute 210 approximately transverse to the longitudinal axis of the containers I2, i.e., the direction the material is discharged from the chute 210 may be moved towards or away from the conveyor 204. FIG. 6 shows the chute 210 overlayed in position A PA and position B PB in which the discharge is directed closer to the conveyor 204 than in position A. The range of motion of the chute 210 along the second axis of rotation allows for it to discharge material anywhere within the depth of the container 302 (i.e., the portion of the container transverse the longitudinal axis), i.e., the chute 210 may be positioned in more positions than A and B along the second axis of rotation. The movement of the chute 210 along the first axis of rotation and second axis of rotation should allow the chute 210 to direct the discharged material to anywhere in a container 302 or 304.

The chute 210 may be moved along the first axis of rotation or the second axis of rotation by a hydraulic cylinder 610. The hydraulic cylinder 610 may be controlled remotely by an operator or automatically by a node or handheld controller. In an embodiment of the present invention, the farm implement 200 may include two hydraulic cylinders, and a first hydraulic cylinder is configured to pivot the chute 210 about a first axis of rotation and a second hydraulic cylinder is configured to pivot the chute 210 about a second axis of rotation. The hydraulic cylinders may be positioned with a first end attached to the conveyor 204 and a second end attached to chute. The positioning of the hydraulic cylinders may be seen, for example, in Brent Avalanche Grain Carts 96 Series (e.g., Model Nos. 1196, 1396, 1596 and 2096). In another embodiment of the present invention, the chutes may be rotated about the first axis of rotation or second axis of rotation by any actuation device, such as linear motors, hydraulic motors, pulleys and cables, servo motors, pneumatic cylinders, belt and chain drive and gear drive. The hydraulic cylinders, or any other actuation device, may be powered by the towing implement's power system or by a separate power system onboard the farm implement. The node may control the power supply to the actuation device to control the position of the chute 210.

In operation, the farm implement 200 is positioned such that the conveyor discharge 208 is over the approximate center of a first container 302. Preferably, the longitudinal axis of the conveyor I1 is approximately perpendicular to the longitudinal axis of the container I2. The chute 210 is positioned in a first position P1 and the system commences material discharge from the chute 210. The weight discharged from the farm implement 210 is monitored by a weigh system, and, when a first target weight is reached, the chute 210 is pivoted from the first position to a second position P2. The chute 210 may continue to discharge material while pivoting to the second position P2 or the system may cease discharging material after the first target weight is reached and restart material discharge after the chute 210 is placed in the second position P2. The system will monitor the weight of material discharged in the second position P2 until a second target weight is reached. If there are more than two positions, e.g., at P1 and P2 the chute 210 is rotated about the second axis of rotation into positions PA and PB, then the system will continue moving the chute 210 into the desired positions until the target weight is reached for each position. The range of motion of the chute 210 along the first axis of rotation is approximately 40° to 90°, and the range of motion of the chute along the second axis of rotation is approximately the same. Preferably, the chute 210 has a range of motion between 50° and 70°, and most preferably 66° to 68°. After the target weight has been reached at all desired positions, the farm implement 200 will move to the next container, if there is a next container. At the second container 304, the conveyor discharge 208 will again be centered and the process described above will be repeated. The system will continue moving to containers and repeating the chute control process until all of the required containers have been filled.

Figure 9:
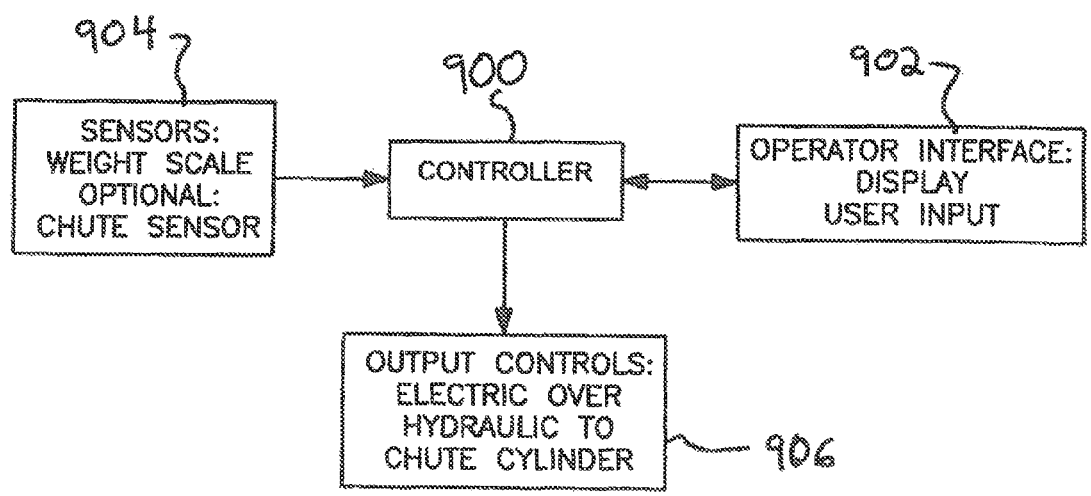
FIG. 9 is a schematic of a controller for a grain cart in which the position of a chute is controlled based on weight according to an embodiment of the present invention.

FIG. 9 illustrates a schematic of a handheld controller 900 configured to control the chute control system in an alternative embodiment of the present invention and the inputs and outputs of the controller 900. Preferably, the weight based chute control is performed by a node on the farm implement or towing implement. The node may be an electronic control unit embedded on the farm implement which includes at least a processor, memory and inputs and outputs to communicate with the various components and systems on the farm implement (e.g., sensors, actuation devices, power supply systems). However, in an embodiment of the present invention, a handheld controller may be used. Handheld controller 900 may include a computer processor, memory, communication ports (e.g., inputs and outputs), and optional data storage. Optionally, it could have wireless communication components, e.g., a transducer for receiving and transmitting data wirelessly via known protocols, for example blue tooth and Wi-Fi. The controller 900 is discussed in further detail below with reference to FIG. 10 and in co-owned applications entitled "Handheld Control Device for Controlling Mobile Farm Implement," U.S. Provisional Application Ser. No. 61/799,957, filed on Mar. 15, 2013, and U.S. Provisional Application Ser. No. 61/821,542, filed on May 9, 2013, the entire contents of which are incorporated herein by reference. The farm implement 200 (or the controller 900) may include an operator interface 902 which allows an operator to input commands or information and includes a display in which the processor may display messages to the operator. The operator may input information such as target weights for each position or the number of containers which the farm implement 200 will be servicing. The display may present information such as which position the chute 210 is in or how much weight has been discharged overall, in a container or in a particular position. The controller 900 received information regarding the weight and the position of the chute from various sensors. For example, the controller 900 may receive information regarding the weight from a weigh sensor, such as a scale, monitoring the weight of the bin 202 and information regarding the position of the chute 210 from chute sensors. The controller 900 controls the conveyor 204 and the chute 210, i.e., the processor may turn the conveyor 204 on or off and may adjust the position of the chute 210. For example, the controller 900 may adjust the position of the chute 210 by outputting electric signals to a valve (commonly referred to as electric over hydraulic) to control the hydraulic flow to the hydraulic cylinders 610 coupled to the chutes. The information received from the sensors 902 is used by the controller 900 to determine which commands to send to the conveyor 204 and chute 210, such as shutting the container door.

Figure 10:
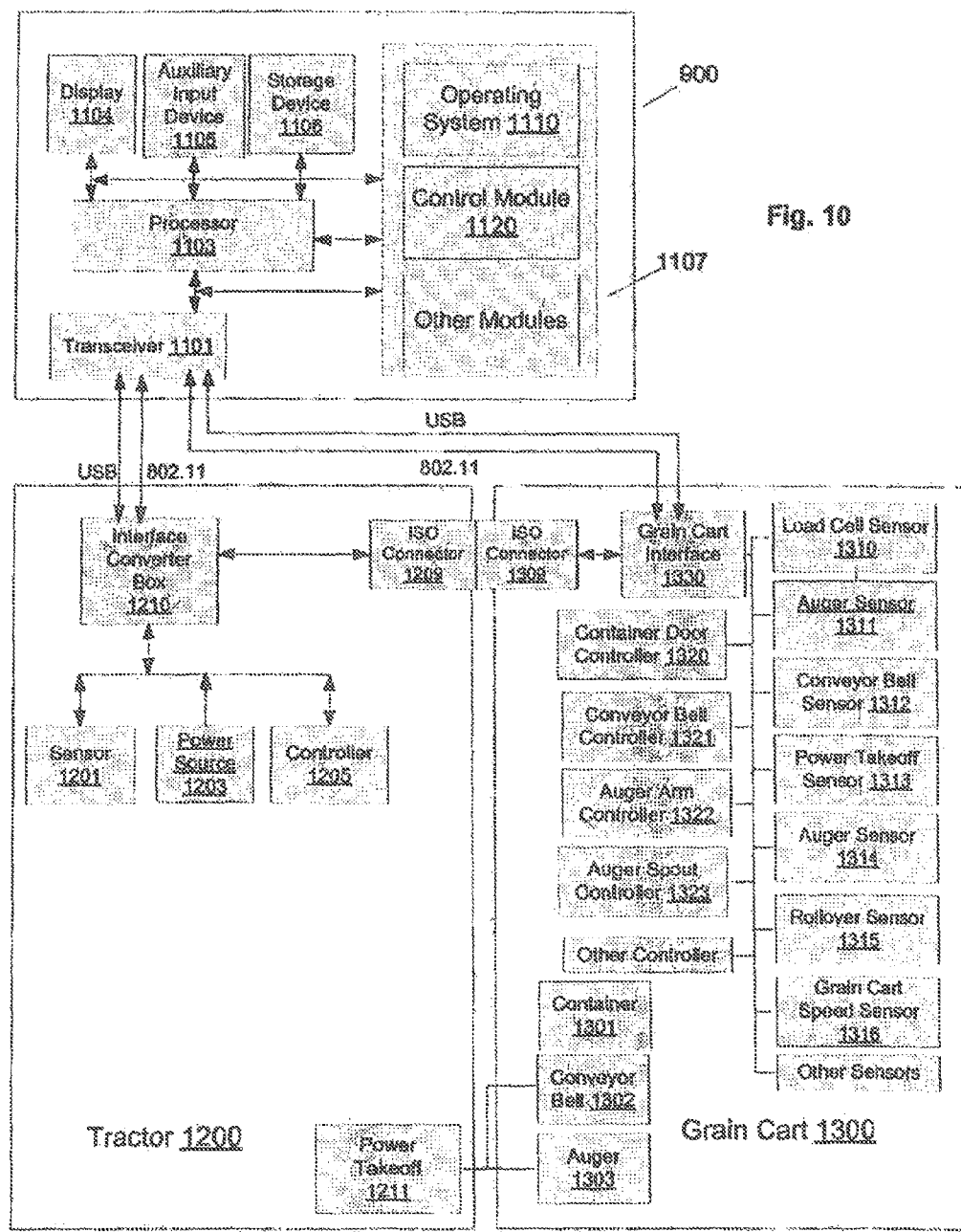
FIG. 10 is a schematic of a controller in communication with a grain cart and a vehicle towing the grain cart according to an embodiment of the present invention.

FIG. 10 illustrates an environment in which a controller 900 interacts with mobile farm implements, such as a grain cart 1300 or a tractor 1200 towing the grain cart, according to an embodiment of the present invention. According to one aspect of the invention, the system provides a controller that may automate at least part of an unloading of agricultural material from a mobile farm implement. The automation may include issuing commands to the mobile farm implement in a desired order and may include automatically monitoring unloading conditions. According to another aspect of the invention, the system provides a controller that is able to communicate with multiple mobile farm implements using different communication protocols. For example, the control device may communicate with one mobile farm implement using an ISO 11783 (i.e., Isobus) protocol and may communicate with another mobile farm implement using an ISO 11898 (i.e., CANbus) protocol. According to yet another aspect of the invention, the controller is a handheld control device that may wirelessly collect sensor data from a mobile farm implement while the control device is located outside the mobile farm implement. For example, a driver in a harvester may wirelessly collect sensor data from a grain cart that is being loaded by the harvester.

In the embodiment illustrated in FIG. 10, the controller 900 may be a handheld computing device, such as a smart phone or a tablet, and may communicate directly with the grain cart 1300, or may do so through another mobile farm implement, such as the tractor 1200. For example, the handheld control device 100 and the grain cart 1300 may communicate directly via a USB or IEEE 802.11 (Wi-FI) or other interface, or the grain cart 1300 may have no USB or IEEE 802.11 capability and rely on the tractor 1200 to provide such capabilities to communicate with the control device 1100.

The controller 900 may be a mobile phone (e.g., iPhone®), a tablet computer (e.g., iPad®), or any other handheld control device. The controller 900 may include a transceiver 1101 for communicating with a mobile farm implement, a display 1104 and auxiliary input device 1105 (e.g., a keyboard) for communicating with a user of the controller 900; a processor 1103 and memory 1107 for executing modules that implement various functionality of the control device; and a storage device 1106 for storing data, instructions, and other information. In an embodiment, the modules may include an operating system 1110 (e.g., iOS®) that provides a platform on which another module, such as control module 1120, executes. For example, the operating system 1110 may allow the control module 1120 to be downloaded as an application and to execute on the controller 900. In an embodiment, the memory 1107 may provide temporary storage for the modules while they are being executed, while the storage device 1106 may provide long-term, non-volatile storage for the modules. The components of the controller 900 may be located inside a housing of the device, or may be externally attached to the housing of the controller 900.

Mobile farm implements such as the tractor 1200 and the grain cart 1300 may interact with the controller 900 by, for instance, sending sensor information to the controller 900 or executing commands received from the controller 900. For example, the grain cart 1300 may provide information about a container 1301, a conveyor belt 1302, or an auger 1303, and may execute commands related to these components.

For the container 1301, a load cell sensor 1310 may measure a weight or volume of agricultural material held by the container 1301, while a container door controller 320 may be configured to open or close a door of the container 1301.

For the conveyor belt 1302, a conveyor belt sensor 1312 may measure a belt speed of the conveyor belt 1302, while a conveyor belt controller 1321 may control the belt speed, tension, or any other property of the conveyor belt 1302.

For the auger 1303, an auger sensor 1314 may measure a position or rotational speed of the auger 1303 or the chute 210, while an auger arm controller 1322 or a conveyor spout controller 1323 may control movement of the conveyor arm or conveyor spout, respectively. If either the conveyor belt 1302 or the auger 1303 is actuated by another power source such as a power takeoff, then a power takeoff sensor 1313 may measure the rotational speed of the power takeoff (e.g., the PTO RPM).

The tractor 1200 may, in an embodiment, likewise have a sensor 1201 for measuring a property of the tractor 1200, such as speed of a power takeoff or an Implement Input Shaft (IIS) or Implement Input Driveline (IID) 1211 used to provide actuation power to the grain cart 1300. In an embodiment, it may have a controller 1205 for controlling a component (e.g., steering component, transmission component, etc.) on the tractor.

Figure 11:
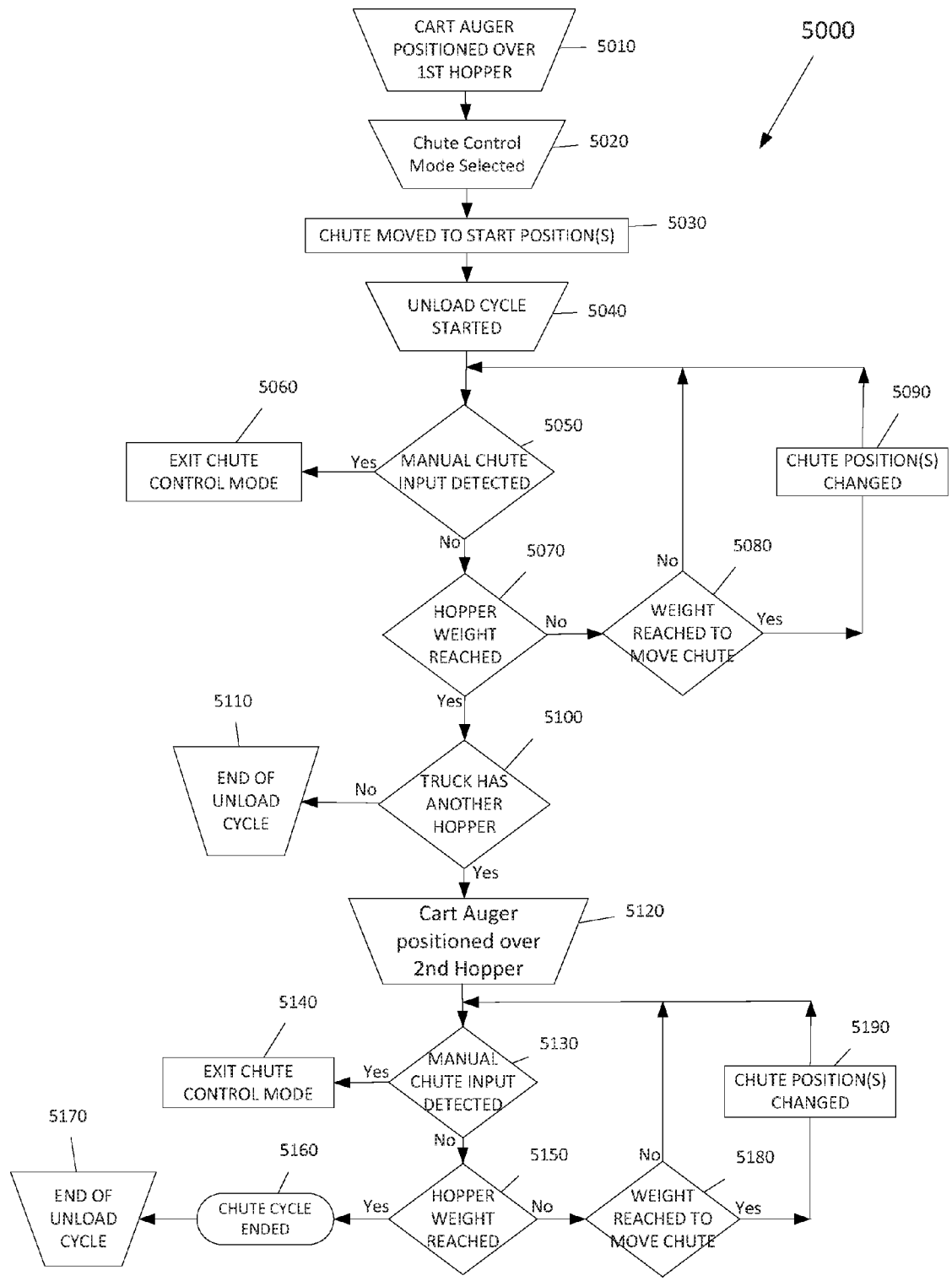
FIG. 11 is a flow chart illustrating a method of controlling the position of a chute discharging material into a container according to another embodiment of the present invention.

FIG. 11 illustrates a method 5000 that may automatically move a chute being used in unloading a mobile farm implement. The method 5000 may be used for a chute mounted to a discharge of an conveyor and rotatable about at least one axis of rotation. The movement of the chute may, for example, facilitate an even distribution of agricultural material across the hopper. In an embodiment, the method 5000 may rely on accessing movement data recorded from previous unload operations, as discussed in further detail below with respect to FIG. 12. In the embodiment, the replay method 5000 may replay the recorded movements as a function of a measured weight from a hopper being unloaded, measured weight of a hopper into which the chute is unloading material or as a function of time.

Operations 5010 through 5040 involve preparing the chute to enter a control mode, which then automates movement of the chute. Operations 5010 through 5040 moves the chute into a start position and activates the control mode. In an embodiment, if the control mode relies on previously recorded movements of a chute, the start position of the chute in the control mode may match a start position of a chute in a learn mode.

During the control mode, a determination may be made periodically at operation 5050 as to whether a manual input is received. A manual input may terminate the automation in the control mode (operation 5060). If no manual input is received, the control mode will monitor the weight of the hopper to determine if the maximum weight of the hopper has been reached at operation 5070. If the hopper weight has not been reached, the system may move the chute based on a threshold weight is reached at operation 5080. For example, the control mode determines whether the hopper has reached a weight that would trigger another incremental movement of the chute. In response to determining that the hopper has reached that weight, the control mode moves the chute by an incremental amount at operation 5090. The chute may have a plurality of positions it will move through while loading a hopper, e.g., a left position, a center position and a right position. In an embodiment of the present invention, the chute can move in at least two planes, and the system may move the chute through positions in both planes, e.g., front left, back left, front center, back center, front right and back right. At various periods, such as after each incremental movement, the control mode may determine at operation 5070 whether the hopper weight (e.g., maximum weight) has been reached. If the hopper weight has been reached, the control mode terminates unloading of material into the hopper.

At an operation 5100, a determination is made as to whether there is another hopper into which material can be unloaded. If there is not, the unload cycle is terminated at operation 5110. Otherwise, the control mode may automate another series of incremental movements of the chute at operations 5120 through 5190. Operations 5120 through 5190 are substantially similar to operations 5050 through 5090. In an embodiment of the present invention, a controller or node may run the unload method 5000. The controller may be a handheld device 900 (as discussed above), incorporated into an existing controller on the farm implement or tractor, or it may be a separate unit specifically designed for this operation.

Figure 12:
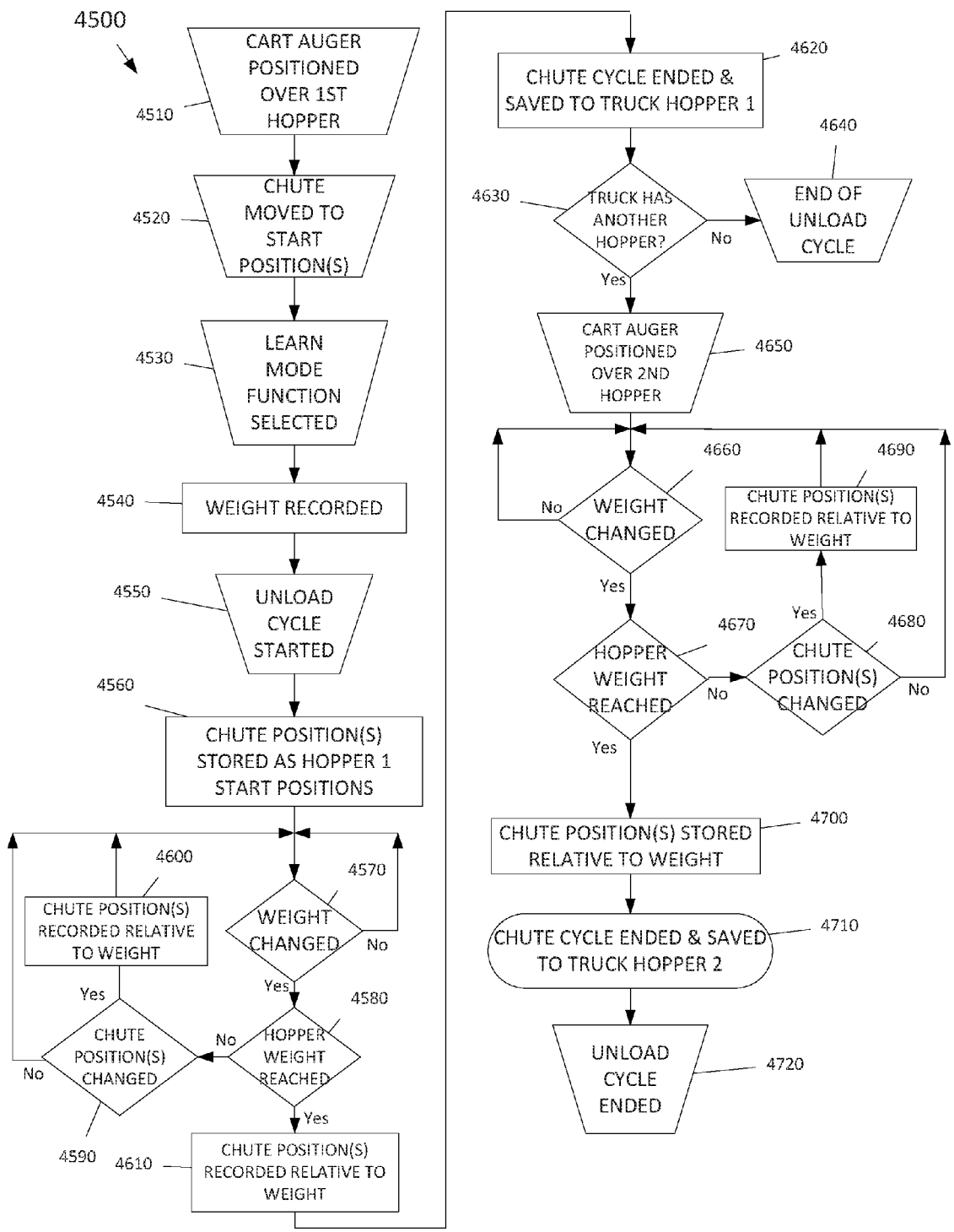
FIG. 12 is a flow chart illustrating a learn function for a weight-based chute control according to an embodiment of the present invention.

FIG. 12 is a flow chart illustrating a method 4500 of unloading a mobile farm implement by controlling the position of a chute discharging material into a container, according to an embodiment of the present invention. The method 4500 involves a learn mode function that stores chute positions during unloading of the implement. The stored positions may later be used to automate movement of the chute during unloading, such as the chute control operation detailed above with reference to FIG. 11. The learn mode function may be implemented on the node mounted on the tractor 200 or the grain cart 300. In an alternative embodiment, the learn mode function may be implements on a handheld controller, such as control device 900 or a separate control device dedicated to the learn mode.

Operations 4510 to operations 4550 involve moving the chute to a start position. The chute may be located at an end of an conveyor, and may be moved in part by moving the conveyor (operation 4510), such as positioning the conveyor over a first hopper. Once an conveyor is placed, the chute may be moved to a start position, such as a center or a side of the hopper (operation 4520). The learn mode function may be enabled, a weight of the hopper being unloaded or of the mobile farm implement into which the chute is discharging material may be recorded (operations 4530 and 4540), and an unload cycle may be started (operation 4550). Operations 4510-4550 may be manual or automatic.

At an operation 4560, a start position of the chute may be recorded. In an embodiment, the start position may be the position of the chute relative to the conveyor or relative to the hopper into which material is being unloaded.

As the hopper begins to be filled, the chute may be moved. At an operation 4570, a determination is made as to whether the hopper weight has changed. If the weight has changed, the method 4500 observes at operation 4590 whether the chute position has changed. The operation may thus learn whether an operator of the mobile farm implement has moved the chute as the hopper is being filled, and may learn a direction or amount of such movement. At an operation 4600, the chute position relative to the recorded weight is recorded if the position of the chute has changed. Operations 4590 to 4600 may thus record how an operator moves the chute as a function of hopper weight during unloading of material into the hopper. Such recorded movement may later be replayed to automate movement of the chute.

Once a target weight of the hopper being filled is reached (4580), the various positions of the chute relative to the weight is recorded 4610 and the cycle is ended and saved for the first hopper 4620. The learn mode operation 4500 may include a step of identifying the hopper being filled, e.g., an identification code for particular hopper volumes or hopper shapes. The user may manually enter this code or the hopper may identify itself (e.g., make and/or model of hopper) by sending a signal to the indicator or controller running the learn mode.

At an operation 4630, a determination may be made as to whether there is another hopper which needs to be loaded by the chute. If there is no other hopper, the unload cycle is terminated at operation 4640. If there is another hopper, another chute learn mode is carried out at operations 4650 through 4710. The operations are substantially similar to operations 4560 through 4610. At an operation 4720, which assumes that no more than two hoppers are being filled, the unload cycle is terminated. In an embodiment of the present invention, there may be more than two hoppers filled and recorded by the learn mode. In an embodiment of the present invention, a controller or indicator may run the learn mode. The controller may be a node on the grain cart, a handheld device 900 (as discussed above), incorporated into an existing controller on the farm implement or tractor, or it may be a separate unit specifically designed for this operation.

From the above it will be appreciated that the weight-based chute control of the present invention allows a chute discharging material to be controlled such that a container receiving the material is evenly filled. It will also be appreciated that various changes can be made to the system without departing from the spirit and scope of the appended claims. For example, the processor may display an alarm when a target weight is reached and an operator may manually adjust the position of chute. In addition, the chute may be rotated by one or more servomotors and the processor may control it with an electrical signal. Additionally, the weight discharged may be determined by measuring the time of discharge and assuming a constant rate of weight discharged, which would allow farm implements without a weight sensor to use the present invention. Also, the system may be able to resume a cycle at a container if the grain cart runs out of material before the container is full. Additionally, the system may move the chute based on time and controlled hydraulic flow rather than relying on the sensors to move the chute between positions. These and other modifications are intended to be encompassed by the appended claims.

We claim:

1. An apparatus for conveying material from a farm implement into a container, comprising:
   a bin for holding an agricultural material;
   a conveyor including a first end configured to receive material from said bin and a second end configured to discharge material; and
   a chute including a first end pivotably coupled to the second end of the conveyor and a second end configured to discharge material, wherein the first end of the chute is pivotable relative to the second end of the conveyor about a first axis of rotation such that the second end of the chute is moveable in a first plane;
   a chute positioning device for pivoting said chute about said first axis;
   a weight sensor for measurement of a weight of the material in said bin and providing a weight sensor output indicative of the weight measurement;
   a position sensor for detecting a position of the chute and providing a position sensor output indicative of the chute position;
   a display coupled to a processor; and
   a controller in communication with said weight sensor output, said position sensor output, and said display,
   wherein the processor is configured to allow an operator to input commands and to display messages to the operator using an operator interface.

2. The apparatus of claim 1, wherein said controller is configured to:
   send a control signal to said chute positioning device to pivot said chute in a first direction about said first axis of rotation into a first position;
   send a control signal to said conveyor to cause material from said container to be discharged from said chute; and
   when the weight measurement meets a predefined threshold, send a control signal to said chute positioning device to pivot said chute in a second direction different than said first direction about said first axis of rotation into a second position.

3. The apparatus of claim 1, wherein said controller is located on the farm implement.

4. The apparatus of claim 1, wherein said controller is portable.

5. The apparatus of claim 1, wherein said controller is handheld.

6. The apparatus of claim 1, wherein a first range of motion of said chute along said first axis of rotation is from 40° to 90° and a second range of motion of said chute along said second axis of rotation is from 40° to 90°.

7. The apparatus of claim 6, wherein said first and second ranges of motion are from 50° to 70°.

8. The apparatus of claim 7, wherein said first and second ranges of motion are from 66° to 68°.

9. The apparatus of claim 1, wherein said processor is further configured to:
 present, on the display, a current position of the chute;
 present, on the display, a current weight of material in said bin; and
 present, on the display, an amount of material discharged during a current unload process.

10. The apparatus of claim 1, wherein said weight sensor is a load cell sensor.

11. A method for learning chute positions during an unload process of a farm implement, the farm implement including a bin for holding agricultural material and a conveyor with a chute at one end for discharging said agricultural material from the bin into a container, the method comprising:
 moving the chute to a start position;
 detecting the selection of a learn mode function;
 prior to unloading, recording a weight of the agricultural material stored within the bin;
 starting the unload process;
 upon starting the unload process, recording the chute start position;
 during the unload process, performing the following two steps until completion of the unload process:
  detecting a change in weight of the agricultural material stored within the bin and a change in position of the chute relative to the bin or container; and
  in response to detecting the change in weight of the agricultural material stored within the bin and the change in position of the chute relative to the bin or container, recording the change in position together with an amount of material discharged during the current unload cycle which is determined from the detected change in weight; and
 upon completion of the unload process, saving the recorded chute start position and each of the recorded changes in position together with the amount of material discharged during the current unload cycle as a chute cycle program.

12. The method of claim 11, further comprising recording and saving with the chute cycle program an identification code for the container being filled.

13. The method of claim 12, wherein the identification code includes make, model, volume, and/or shape of the container being filled.

14. The method of claim 11, further comprising:
 determining that there is a second container that needs to be filled by the chute;
 determining that the second container can be filled by the stored chute cycle program;
 executing the stored chute cycle program to fill the second container, wherein executing the stored chute cycle program includes moving the chute to the chute start position and replaying the changes in position of the chute when the amount of material discharged during the current unload cycle matches the corresponding amount saved in the chute cycle program for the change in position.

* * * * *